Patented May 10, 1932

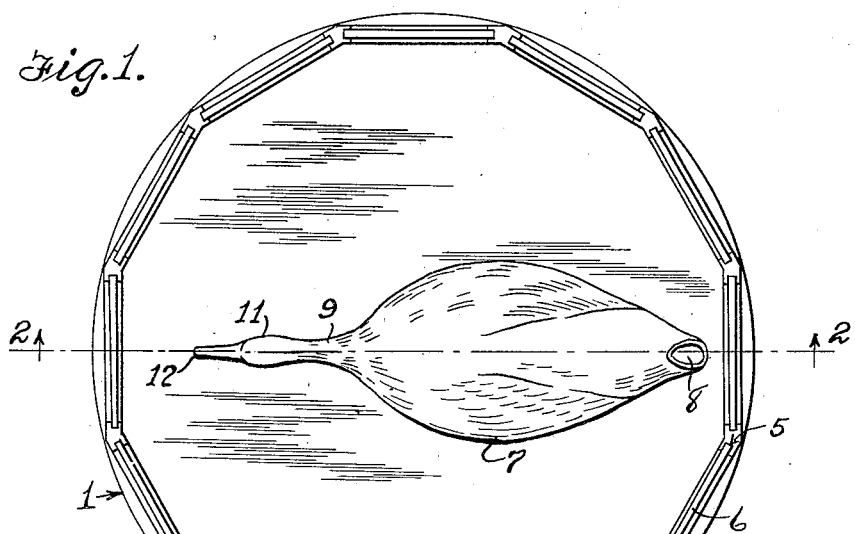
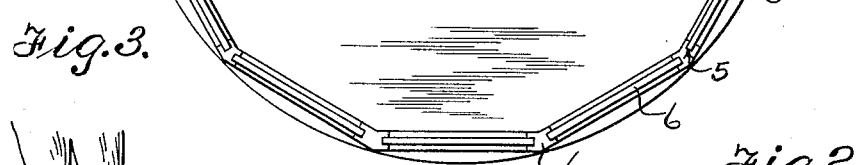
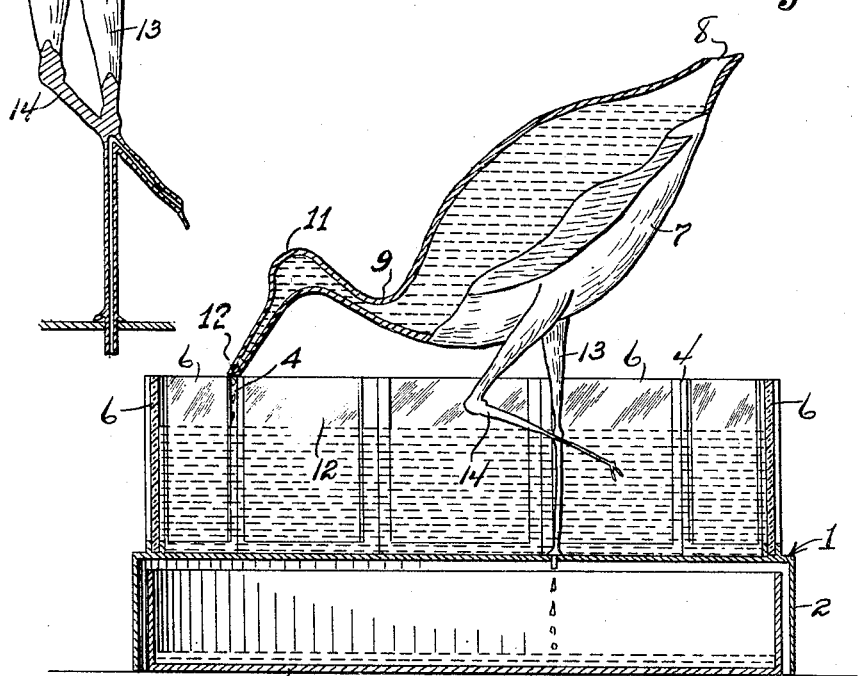

1,858,181

UNITED STATES PATENT OFFICE

GASPAR ROBERT BOSSETTA, OF NEW ORLEANS, LOUISIANA

AQUARIUM

Application filed June 28, 1930. Serial No. 464,518.

This invention relates to aquariums and its general object is to provide an aquarium including means whereby the water for the fish can be conveniently and constantly changed, and the change takes place without materially affecting the temperature of the water occupied by the fish and without materially disturbing the fish, with the result the life of the fish is not endangered and will be prolonged.

A further object of the invention is to provide an aquarium in which the means for accomplishing the function mentioned is ornamental and attractive and adds materially to the appearance to the aquarium, as the means is in the form of a graceful bird or other wild life.

Another object of the invention is to provide an aquarium of the character set forth, that is simple in construction, reasonably inexpensive to manufacture, and extremely efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a top plan view of the aquarium which forms the subject matter of the present invention.

Figure 2 is a sectional view taken approximately on line 2—2 of Figure 1, looking in the direction of the arrows.

Figure 3 is a fragmentary sectional view illustrating the drainage means for the aquarium.

Referring to the drawings in detail, the reference numeral 1 indicates the base of my device which as shown may be circular in formation and includes a vertical wall 2 whereby the top of the base is elevated and together with the vertical wall provides a housing for an open top receptacle 3.

Secured to the base or formed therewith in any well known manner and rising therefrom is a frame 4 which as best shown in Figure 1 is made up of sections and each section is substantially U-shape in configuration. The sections are channeled as at 5 for the purpose of receiving sheets 6 of transparent material such as glass, there being one sheet 6 for each of the sections as clearly shown in Figure 2. The sheets are cemented within the channels in a manner to provide a water-tight connection between the frame and sheets of glass together with the top of the base provide a bowl to accommodate water for the fish, it being apparent the top of the base provides a bottom for the bowl.

While I have shown a bowl having squared portions, I want it understood that the bowl can be of any desired shape without departing from the spirit of the invention, but in any event there is arranged in the bowl an object which simulates some form of wild life such as a graceful bird, as shown, but a frog or the like may be employed if desired.

The object which is indicated by the reference numeral 7 is hollow and has its body disposed in an inclined position, with the upper end of the body open to provide an inlet 8 for water, while the neck 9 of the object is curved upon itself, with the head 11 disposed at a downward inclination, and the bill is likewise hollow and is tapered to an extent whereby a very small outlet 12 is provided for the passage of water therethrough. The bill overlies the bowl for a purpose which will be presently apparent.

The body of the bird as shown is supported through the instrumentality of a leg 13 which is of tubular formation at its lower portion which has its lower end secured in any appropriate manner to the bottom of the bowl, while an extension is formed with the leg to provide an outlet slightly larger than the outlet 12 and which extends through the bottom for directing water from the bowl to the receptacle 3. The other leg is indicated by the reference numeral 14 and is likewise of tubular formation at its lower portion, with the upper end of the tubular portion terminating in communication with the upper end of the tubular portion of the leg 13, and the tubular portion of the leg 14 is disposed at an inclination and arranged whereby it will be immersed in the water of the bowl.

From the above description and disclosure of the drawings, it will be obvious that I have provided an aquarium that is not only attractive and ornamental in appearance, but provides for a change of the water within the bowl and such is brought about by filling the body of the object 7 with water as shown in Figure 2, consequently the water will drip from the bill of the head 11 within the bowl, and as the water within the bowl rises to a height where it is disposed above the juncture of the tubular portions of the legs 12 and 13, a siphonic action takes place and the water will be drawn up through the tubular portion of the leg 13 and pass down through the tubular portion of the leg 12, and thence be disposed within the receptacle 3 which of course can be emptied by merely lifting the base from about the same, when it becomes necessary to do so, with the result that the water within the bowl will be constantly changed as long as the hollow object 7 contains water. It will be seen that the fish are not disturbed in any manner and the water introduced within the bowl from the body of the object 7 is practically the same temperature as the water within the bowl and so is very beneficial for the health of fish, therefore my aquarium will add materially to the life of the fish.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. An aquarium comprising a base, a receptacle arranged in said base, a bowl supported by said base, an object in the form of wild life including legs, one of said legs supporting said object within said bowl and being tubular for a portion of its length, the tubular portion extending through the base for disposal above the receptacle, the other leg including a tubular portion arranged at an inclination and in communication with the tubular portion of the first mentioned leg, the object including a body for receiving water and having an outlet above the point of communication of the tubular portions.

2. An aquarium comprising a base, a receptacle arranged in said base, a bowl including a portion of said base and rising therefrom, an object in the form of wild life including legs, one of said legs supporting the object and including a tubular portion for directing water to the receptacle, the other leg including a tubular portion arranged at an inclination and opening into the bowl at one end and being in communication with the first mentioned tubular portion at its other end, a hollow body included in said object and being adapted to receive water, a head for said body, a tapered member formed with said head and terminating in an outlet arranged above the point of communication of the tubular portions, and said body being arranged at an inclination and having an inlet in its upper end.

3. An aquarium comprising a hollow base, an open top receptacle arranged in said base, a bowl including the top of said base which provides the bottom of the bowl, a frame secured to the top and being made up of sections, a plate of glass included in each section and secured thereto in a manner to provide a water-tight connection, an object including legs, one of said legs supporting said object within the bowl and including a tubular portion arranged in communication with the receptacle, the other leg including a tubular portion opening into the bowl at one end, while its opposite end is arranged in communication with the first mentioned tubular portion, said body being hollow and arranged at an inclination, and said body having an inlet at one end and an outlet at its opposite end.

4. An aquarium comprising a base, a receptacle arranged in said base, a bowl including a portion of said base and being supported thereby, a hollow object adapted to receive water, means for supporting said object in said bowl and including a communicating tubular portions in communication with the receptacle and bowl to allow water to pass from the latter to the receptacle, and said object having an inlet at one end and an outlet at its opposite end with the outlet arranged for disposing water in said bowl.

In testimony whereof, I affix my signature.

GASPAR R. BOSSETTA.